March 24, 1953  C. S. SKOGEN  2,632,454
COLLAPSIBLE ICE FISHING SHELTER

Filed May 18, 1950  2 SHEETS—SHEET 1

INVENTOR
C. SHERMAN SKOGEN
BY Philip M. Stutrud
ATTORNEY

March 24, 1953      C. S. SKOGEN      2,632,454
COLLAPSIBLE ICE FISHING SHELTER
Filed May 18, 1950      2 SHEETS—SHEET 2
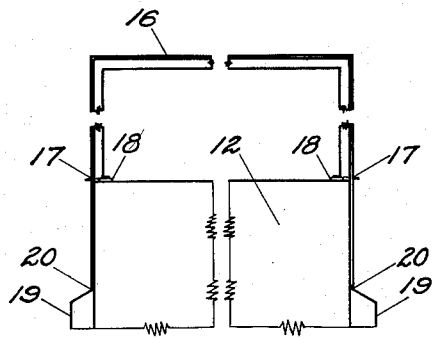
Fig. 6
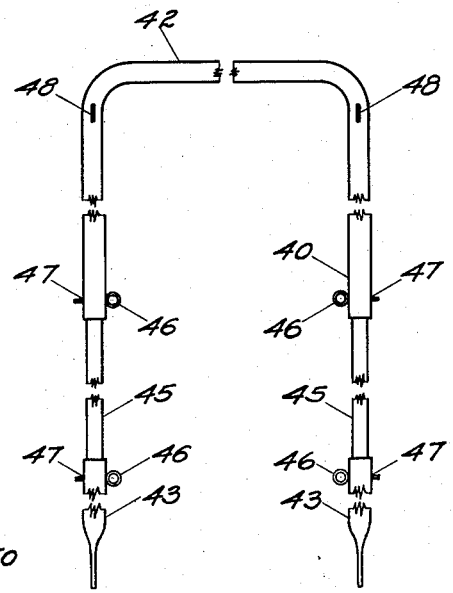
Fig. 8
Fig. 7
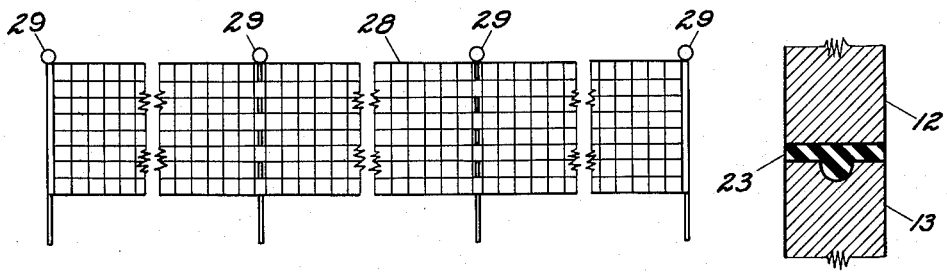
Fig. 9
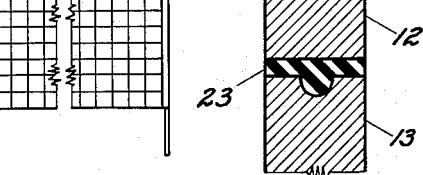
Fig. 10
INVENTOR
C. SHERMAN SKOGEN
BY Philip M. Stutrud
ATTORNEY Patented Mar. 24, 1953

2,632,454

UNITED STATES PATENT OFFICE 2,632,454

COLLAPSIBLE ICE FISHING SHELTER

Charles Sherman Skogen, Excelsior, Minn.

Application May 18, 1950, Serial No. 162,689

2 Claims. (Cl. 135—4)

This invention relates to collapsible ice fishing shelters, and particularly to one of such construction, that the fabric covering as well as the folding case containing it all, serve as structural parts of it, resulting in a very light portable outfit, and with the case made water tight, will also serve as a life preserver.

Collapsible tents and camping outfits, and more recently, some collapsible structures for ice fishing have been devised. For the most part, these are too bulky and also require complicated framing, which is expensive to produce. These are variously arranged, to be supported on a trailer, on runners with draft connection to an automobile, or on a conventional sled, and are not very portable otherwise. Some require guy wires or ropes, to provide stability. In the main, these consist merely of a foldable frame, with a canvas cover over it. Not much has been accomplished, in devising a shelter, wherein the principal members serve more than one purpose. By advantage of such double use of members, particularly in a structural way, a very light and compact shelter can be provided. There is a great need for such a very light shelter, which, not only with the necessary paraphernalia, is easily handled to the fishing grounds, but which is so light, that by making a water tight case as a part of it, will also serve as a large life preserver.

An important object of my invention is to provide a collapsible ice fishing shelter, of such construction, that the fabric covering for it and the folding case containing it, also serve as structural parts of it, making possible an extremely light portable shelter.

Another important object is to combine such an extremely light structure, with a water tight joint between parts of the folding case, so that it will serve as a life preserver.

Another important object is to so shape and construct the folding case, that in addition, it will also serve in the manner of a toboggan, to easily transport the shelter on ice or snow.

An important object is to provide such a shelter of durable construction, but at a reasonable price, so most fishermen can afford it.

Other objects will be apparent from the description and appended claims.

For a full disclosure of my invention, reference is made to the description following and to the drawings, in which—

Figure 1:
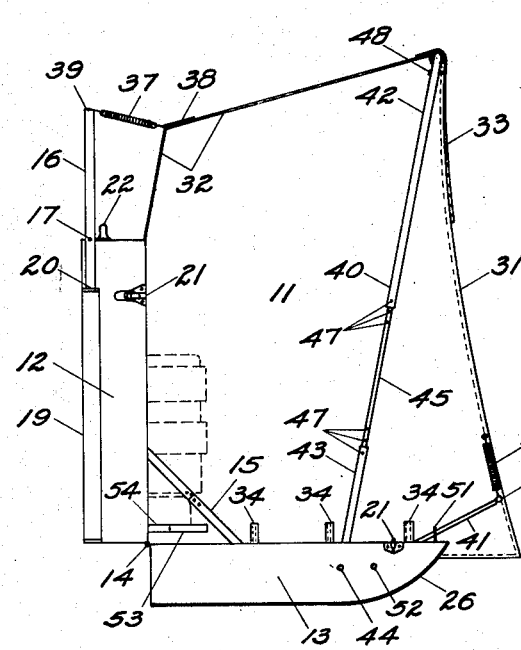
Fig. 1 is a side elevation view of the shelter in erected position, with the fabric cover shown in section on the center line, to clearly indicate the relative parts, providing structural support.
Figure 2:
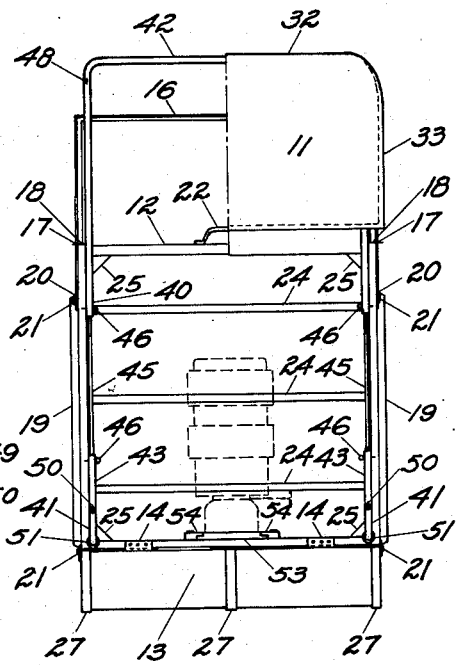
Fig. 2 is a front elevation view of the same kind.
Figure 4:
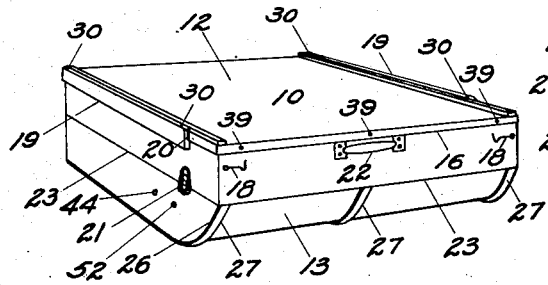
Fig. 4 is a perspective view of the folding case, with the shelter collapsed into same; and case in position to be transported like a toboggan.

Figs. 6 to 10 inclusive, are views on an enlarged scale, to show respectively a sliding frame, telescoping struts with an inverted U frame, demountable spars, demountable pack rack, and a gasket between closing edges of the case.

Referring now to the several figures of the drawing, the reference character 10 indicates generally the carrying case, and the reference character 11 indicates generally the fabric cover and structure. The carrying case 10 consists of a top portion 12 and a bottom portion 13. These portions are of substantially the same depth and are joined at the back by hinges 14. To maintain the top portion in a right angle position with respect to the bottom portion, when open, jointed leg braces 15 are provided on each side. These are of conventional type, with pivoted mountings on the inner sides respectively of the top and bottom portions, and have a spring locking device at the intermediate pivot point. A sliding frame 16 is provided, to extend upwardly from the top portion 12 of the open case, to be used, as subsequently described. This frame is provided with holes 17, to be engaged by screen door hooks 18 or other pinning device, to lock the frame in position. Cleats 19, on each side of the top portion 12, provide slideways 20 for the frame 16, as shown in detail in Fig. 6. These cleats also provide convenient hand holds, when placing or removing the case from the compartment of an automobile. Conventional latches 21 and a handle 22 are provided respectively for tightly closing and for carrying the case. A water tight gasket 23 of rubber or other compressible material, as shown in detail in Fig. 10, is provided between all joining edges of the top portion 12 and the bottom portion 13, for a purpose to be subsequently described. Such gasket could be attached to either edge or both, but is preferably attached to the edge of the top portion, where it will not be damaged. With a cross section of the gasket, as shown, having a bead engaging a groove, a practical water tight joint is provided. To make the top and bottom portions 12 and 13 of the case water tight, different materials and different conventional methods of joining may be employed. The ribs 24 in the top and bottom portions and the blocks 25 in the corners are merely indicative of structure, to provide a case 10 that is sufficiently strong. The bottom portion 13 has an upwardly curved section 26 at the front thereof, so that the case may be pulled on the ice and snow, like a toboggan. This is readily accomplished by looping a rope through the carrying handle 22. Runners 27, preferably of alloy metal, are provided to take the wear and tear, when so used. A demountable rack 28, if so desired, is provided across the back and along the sides at the top of the case, by means of pins 29, inserted into holes 30, provided in the cleats 19.

This rack is preferably a netting of rawhide or similar material, which may be readily folded and kept within the case. It may be continuous and across the front also, or a strap provided across the front for a large carrying capacity of clothing, equipment and duffel.

Figure 3:
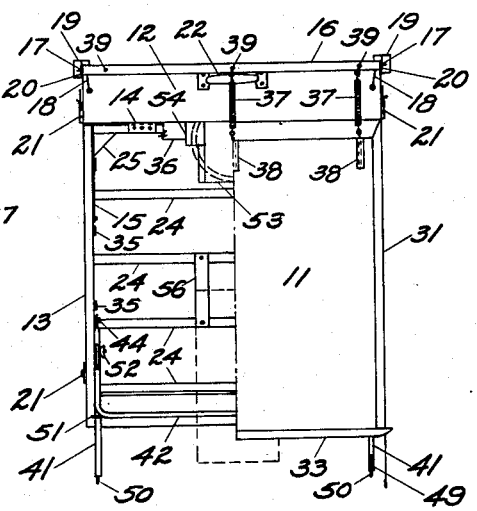
Fig. 3 is a top plan view of the same kind.
Figure 5:
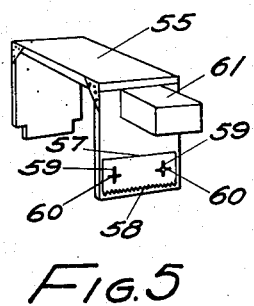
Fig. 5 is a perspective view of a stool, which is engageable with the structure of the bottom of the case, and which is to be contained in the case.

The fabric cover and structure 11 consists of sides 31, a roof 32, and a front flap 33, all joined in a conventional manner by sewing. The sides and roof are respectively secured, in a tight manner, to the inner side of the sides and top of the main back portion, formed by the top 12 of the open carrying case. This may be by any conventional means of tacking and strips or by cementing. Conventional fabric ties 34 are provided on inner side of fabric sides 31, to secure same to fasteners 35, on the inner side of sides of the bottom portion 13. A flap 36, indicated by a fragment in Fig. 3, is secured to the inner side of the main back portion, in a manner to cover the crack, occasioned by the hinges 14. To bring the roof of the fabric structure in distended shape, coil springs 37 are provided. These springs, by appropriate fasteners engage respectively tabs 38 of the fabric structure and holes 39 in sliding frame 16. This frame, as previously referred to, slides upwardly and is locked in a determined position. It forms a standard extending upwardly from the main back portion 12. To act with this support, and provide means for the fabric cover to also act in tension, in providing a structure with a minimum of material, an inverted U-shaped demountable frame, indicated generally by the character 40, and two demountable spars 41 are provided. The frame consists of an inverted U-shaped upper portion 42, around the horizontal portion of which the fabric cover is sewed; and two lower portions or legs 43. These legs have flattened ends and are secured to the portion 13 of the case with bolts and nuts 44. The nuts for these bolts might be wing nuts, but since these legs fold back into the case, when the structure is dismantled, wing nuts are not essential. Intermediate extensions 45, preferably slidably fitting inside of portions 42 and 43 on each side, provide extension and proper height of the inverted U frame. With height satisfactorily adjusted, pins 46 passing through holes 47, in register in portions 42 and 43 with respective ends of 45, make the position fixed. These pins, for convenience, may be attached to respective parts with thongs. The parts of the frame 40 would commonly be made of round tubing, but could as well be made of square tubing, which would make matching of holes for pins easier. A fastener 48 secures the sewed cord edge of fabric sides 31 to the frame 40, on each side, near the top. At the bottom, on each side, a spring 49 secures this edge to the spars 41. To accommodate the hook of the spring, eyes 50 are provided in the ends of the spars. The spars pass through eyes 51, secured in the edge of bottom portion 13. These, together with bolts with nuts 52, maintain spars in fixed position. The bolted ends of the spars are flattened to accommodate the nuts. These nuts are preferably wing nuts, since the spars must be unbolted, to dismantle the structure. It is obvious, that the entire fabric cover, except the front flap 33, is subjected to tension; and without thus utilizing this quality, it would be impossible to provide a structure, with such a minimum of rigid members, acting in bending and compression. The front flap 33 may be provided in full length and with a window of transparent flexible material, if so desired. This may be very desirable when the shelter is used for some purposes; but for ice fishing, the flap shown by the drawings, seems preferable.

To equip the shelter ready for use, a bracket for a stove and a stool of a size to fit into the carrying case when closed, are needed. A stove bracket 53, with flanged edges, slidably fits between grooved cleats 54, secured to the inside of the top portion 12 of the case, as indicated by different views of the drawings. A conventional gasoline stove, as indicated in dotted outline, is secured to the bracket. The case may be closed, with the bracket and stove in position, or the bracket slipped out, and with the stove attached, placed in the bottom of the case. The stool 55 has one of its end pieces notched, to transversely engage two cross pieces 56, secured to ribs 24 in the bottom portion of the case. With the one end thus engaged, the other end will extend outside of the case and onto the ice. This end is preferably equipped with a plate 57, having serrations 58 and elongated slots 59, by which it may be secured to the end of the stool, by bolts with wing nuts 60. The plate is therefore adjustable vertically, to give the required engagement of the serrations into the ice, to anchor the shelter against action of the wind. The plate may be withdrawn back beyond the end of the stool and clamped, thereby providing an effective shield against damage by the serrations, when the stool is placed in a flat position inside the folding case. A drawer 61 is provided in the stool, for keeping fishing tackle and the like. Dotted outline in Fig. 3 shows stool in place.

The shelter is quickly set up ready for use, and in reverse order of operations, quickly dismantled and folded into the carrying case, for transporting. The order of operations in setting it up is as follows:

(a) Unlatch the case and open it through 90 degrees, where it is locked in position by the jointed leg braces 15.

(b) Pull the sliding frame 16 upward, so the holes 17 are engaged by screen door hooks 18.

(c) Unfold the fabric cover from inside the top portion of the case, and by use of the coil springs 37 engaging tabs 38 of the cover and holes 39 in the sliding frame 16, provide support for the back of the cover.

(d) Place the two spars 41, by slipping the forward end through the eyes 51, and securing the other end with the wing nutted bolts 52.

(e) Set up the inverted U frame 40, the upper portion 42 of which is secured to the fabric cover, and the two legs 43 of which are pivotally secured inside the bottom portion 13 of the case. The frame is completed by sliding the intermediate extensions 45 out of the respective sides of the portion 42 and into engagement with the legs 43, by pins 46 engaging holes 47 in register, at respective ends of extensions 45.

(f) Bring fabric cover into fully distended shape, by engagement of coil springs 49 with eyes 50 in spars 41, and by securing ties 34.

By placing the stove in position, by means of the bracket 53, and setting the stool 55 to engage the cross pieces 56, and with the serrated plate 57 engaging the ice, the shelter is ready for use. The shelter is placed so that the fishing hole is on the leeward side, and with the shelter close enough to the hole so that the fisherman, sitting on the stool, can manipulate his fishing line. With the flap 36 placed over the hinge crack and the front flap 33 in position, draft is shut out and heat is retained in the shelter. With his back to the stove, the heat of which is also reflected by the portion 12 of the case, the fisherman is kept comfortable in the coldest weather.

From the foregoing, it is apparent how my collapsible ice fishing shelter is constructed, and how it may be quickly and easily set up or dismantled. Its many advantages over others, heretofore devised, must also be apparent. Because of its novel structure, wherein the principal members serve also purposes additional to their usual and apparent purposes, the very light weight and compactness is made possible. The carrying case and the fabric cover also serve as structural elements in forming the shelter. The case, opened up through 90 degrees and secured in that position by the jointed leg braces, provides the floor portion and the main back portion. A sliding frame is extendible upwardly from the back portion, and by demountable struts and spars within the cover, the cover being secured to the sides and top of the back portion, acts in tension in combination with the frame, struts and spars and aided by tension springs, to form the fully distended shape and desired enclosure. With the case and the cover serving in lieu of frame work, the result is a structure formed by a minimum number of structural members, and all in all with the least amount of material. It is very compact and can be carried by a handle, like a suit case. Even with a supply of gasoline in the stove, to last for several hours, the weight is only about 45 pounds. Because of the extreme lightness of the construction, and the manner in which the folding case is constructed, a life preserver is made possible by insertion of a rubber gasket along the joining edges. This provides a very desirable feature in the construction, to co-operate with the use of the shelter. Quite a number of persons, taking part in the sport of ice fishing, are drowned each year; due to exploring unknown areas, with thin ice, to locate fishing spots and in going to and from fishing grounds. After a location is made, on ice of determined safe thickness, no danger is involved. In case the fisherman breaks through the ice, the life preserver, provided by my invention, is ample to support him and even a companion. It is so shaped that it may be slid out of the water and onto the ice, and such distribution of weight afforded on the ice that very thin ice will not be broken up by the weight of the fisherman. Being thus supported, the fisherman can slide onto the ice, and then by keeping the case within reach, can roll or slide in a flatwise position to safety. After such an ordeal, the fisherman will usually be in need of heat and shelter to thaw him out. With matches, kept dry inside the water tight case or in a waterproof pocket match box, the fisherman can quickly set up the shelter and start the stove. Clothes can be dried out, hot coffee made, and soon the fisherman is none the worse for his bad experience. Further, the shape and construction of the case make it adaptable to be pulled like a toboggan across the ice and snow. The top of the case affords ample space to transport sacks of fish, minnow buckets and other articles. By providing a rack around the top, which preferably is demountable and foldable, to fit in the case, a large carrying capacity can be provided. In that case, a pull rope can be secured with fasteners at the two forward corners, instead of merely looping same through the carrying handle. Because of the novel structure and the double use of members, such a shelter can be produced at a reasonable price, but of durable construction. The fabric covering may after much use require replacement, but if treated fabric is used, this will also last a long time.

Several other uses, besides ice fishing, might be made of the shelter. It will serve well for soldiers on guard duty, prospectors, timber cruisers, trappers, hunters, wood choppers, auction clerks, traffic checkers and surveyors. It provides a means to escape actions of the elements and warm up, prepare coffee and victuals, and transcribe notes and make records. The case may readily be provided with pack straps, where conditions do not permit its use like a toboggan, and where it is too far to carry it by the handle.

While I have shown and described a preferred form of my invention, it is obvious that many changes, which are within the scope of my invention, will be apparent to those skilled in the art. I therefore desire to be limited only by the scope of the appended claims.

What I claim is:

1. A device of the class described, comprising a carrying case, a collapsible superstructure and a flexible covering; said carrying case consisting of two portions hingedly united, one portion being adapted to form a floor and the other portion being adapted to form a part of the back structure of said device, and having means to hold said portions in said relative positions substantially at right angles to each other; said collapsible superstructure consisting of a slidably extendible frame secured to the exterior of said back portion, a demountable extendible inverted U frame secured to the interior of said floor portion, and a demountable spar secured to the interior of each said side of said floor portion and extending forwardly therefrom, said inverted U frame and said spars when demounted being of dimensions to fit into said case; said flexible covering being secured to the top and sides inside said back portion and to the top of said inverted U frame, and having means to tensionally secure same to said slidably extendible frame and to said spars, whereby said covering acts in tension to cooperate with said collapsible superstructure to provide a stable structure co-incident with its distended shape, providing a covering forming an open front shelter of dimension to accommodate a person in a sitting position, said covering being adapted to fold and fit into said case when closed together with said collapsible superstructure, and the floor portion of said case being shaped and adapted for pulling same on ice and snow.

2. A device, as claimed in claim 1, characterized by the addition of a gasket between the closing edges of said carrying case to render same water tight, whereby said device when in a closed position by reason of its lightness compared to its displacement will also act as a life preserver.

CHARLES SHERMAN SKOGEN.

REFERENCES CITED

The following references are of record in the file of this patent:

UNITED STATES PATENTS

| Number | Name | Date |
| --- | --- | --- |
| 1,818,914 | Verdini | Aug. 11, 1931 |
| 2,057,252 | Sink | Oct. 13, 1936 |
| 2,291,900 | Jimmes | Aug. 4, 1942 |
| 2,301,089 | Stevens | Nov. 3, 1942 |